H. Dunham Jr.
Boots & Shoes.
No. 3387 Reissued Apr. 20. 1869
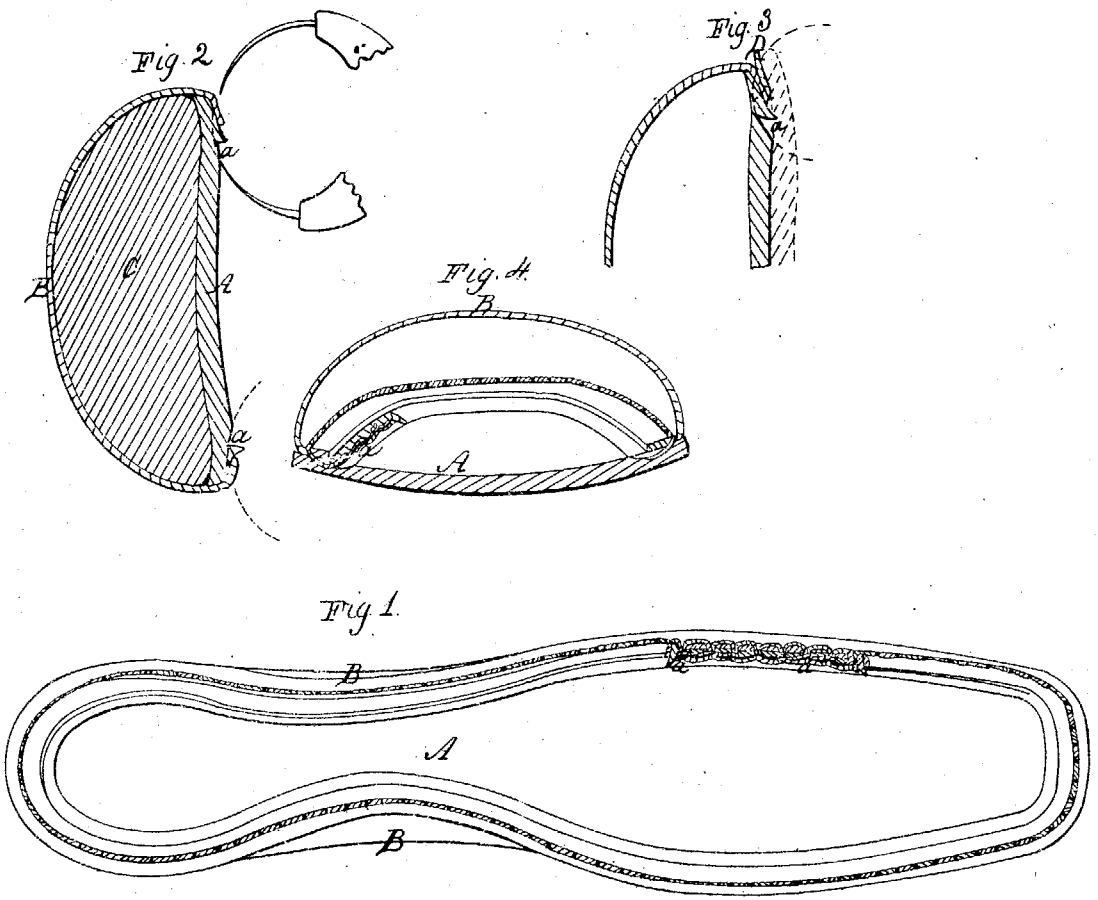
Inventors
F. W. Barnuth & E. P. Richardson
by Knight Bros
attys.
Witnesses
W. B. Denny
Wm. H. Breeton Jr.

UNITED STATES PATENT OFFICE.

FRANCIS W. CARRUTH, OF BOSTON, AND EVERETT P. RICHARDSON, OF LAWRENCE, MASS., ASSIGNEES OF HENRY DUNHAM, JR.

IMPROVEMENT IN SEWED BOOTS AND SHOES.

Specification forming part of Letters Patent No. 50,462, dated October 17, 1865; reissue No. 3,387, dated April 20, 1869.

*To all whom it may concern:*

Be it known that HENRY DUNHAM, Jr., of Arlington, Massachusetts, invented certain new and useful Improvements in Sewed Boots and Shoes, of which the following is a sufficiently full and exact description to enable one skilled in the art to which the invention appertains to carry it into effect, reference being had to the accompanying drawings which form a part of this specification, and which represent more clearly than the drawings in the original Letters Patent the invention for which the patent was granted.

The subject of the said invention is a machine-made boot or shoe, in which the upper is connected to the sole by chain-stitches, which are curved in planes transverse to the line of the seam, dipping into the surface of the sole, and passing out at the same surface or at the edge, without passing through the whole thickness of the sole, and which stitches have their loops or chain concealed or embedded within a channel or groove in the sole.

In the drawings, Figure 1 is an under-side view of a shoe sewed according to this invention, and ready for turning, a part of the upper and sole leather being removed to show the position of the stitches. Fig. 2 represents a transverse section of a similar shoe in position on its last and in course of being sewed. Fig. 3 is a transverse section of a portion of a welted shoe in course of being sewed according to this invention, the red lines indicating the position of the outer sole, which is afterward applied, but which constitutes no part of this invention. Fig. 4 represents a transverse section of a complete turned shoe, a portion of the leather being removed to expose the stitches.

In carrying out the invention the sole A and upper B are firmly secured to the last C in any customary manner. The sewing may be performed by the machine described in Letters Patent granted to the said HENRY DUNHAM, Jr., on the 9th of September, 1862, or by any other suitable machinery, by which the loops of waxed thread, after passing through the upper B and through the welt D, if a welt be used, will be drawn through a part only of the thickness of the sole, entering either at the edge or at the same surface on which they pass out, and embedded within a channel or groove, *a*. By this mode of sewing, the upper, either with or without a welt, is drawn toward and into close contact with the sole in the act of tightening the stitches, and the loops or chain of the thread, being embedded within the channel or groove, will be concealed from view, so that the work resembles that performed by hand.

From the foregoing description it will be apparent that the invention is applicable to the sewing of the upper to the soles, in either turned or welted shoes or boots, either class of work being finished in the customary manner.

The following is what is claimed as new in the invention of the said HENRY DUNHAM, Jr.:

1. A machine-made boot or shoe, having its upper connected to the sole by chain-stitches, which pass only partially through the thickness of the sole, and the chain or loops of which are concealed, or embedded, or received within a channel in the sole.

2. A boot or shoe whose upper is connected to the sole by chain-stitches which dip into the sole without passing through its entire thickness, and are curved in planes transverse to the seam.

FRANCIS W. CARRUTH.
EVERETT P. RICHARDSON.

Witnesses for FRANCIS W. CARRUTH:
CHARLES T. CARRIT,
GEO. C. BARRETT.

Witnesses for EVERETT P. RICHARDSON:
WM. H. BRERETON, Jr.,
JOHN GRINNELL.